US010114106B2

(12) United States Patent
Schiffmann et al.

(10) Patent No.: US 10,114,106 B2
(45) Date of Patent: Oct. 30, 2018

(54) AUTOMATED VEHICLE RADAR SYSTEM WITH AUTO-ALIGNMENT FOR AZIMUTH, ELEVATION, AND VEHICLE SPEED-SCALING-ERROR (71) Applicant: DELPHI TECHNOLOGIES, INC., Troy, MI (US)

(72) Inventors: Jan K. Schiffmann, Newbury Park, CA (US); Yu Liu, Newbury Park, CA (US); David A. Schwartz, Moorpark, CA (US); Xumin Zhu, Calgary (CA)

(73) Assignee: DELPHI TECHNOLOGIES, INC., Troy, MI (US)

( * ) Notice: Subject to any disclaimer, the term of this patent is extended or adjusted under 35 U.S.C. 154(b) by 278 days.

(21) Appl. No.: 15/216,866

(22) Filed: Jul. 22, 2016

(65) Prior Publication Data
US 2018/0024228 A1 Jan. 25, 2018

(51) Int. Cl.
*G01S 7/40* (2006.01)
*G01S 13/86* (2006.01)
(Continued)

(52) U.S. Cl.
CPC .......... *G01S 7/4026* (2013.01); *G01S 7/415* (2013.01); *G01S 13/60* (2013.01); *G01S 13/86* (2013.01);
(Continued)

(58) Field of Classification Search
CPC .................................................. G01C 21/005
See application file for complete search history.

(56) References Cited

U.S. PATENT DOCUMENTS 4,495,580 A * 1/1985 Keearns ............... G01C 21/005
342/64
6,087,995 A * 7/2000 Grace .................... G01S 7/4026
340/903

(Continued)

FOREIGN PATENT DOCUMENTS

DE 10 2015 012 246 A1 3/2016
DE 10 2014 223 461 A1 5/2016
JP 3189711 B2 7/2001

*Primary Examiner* — Bernarr E Gregory
(74) *Attorney, Agent, or Firm* — Lawrence D. Hazelton (57) ABSTRACT

In accordance with one embodiment, a radar system with auto-alignment suitable for use in an automated vehicle is provided. The system includes a radar-sensor, a speed-sensor, and a controller. The radar-sensor is used to detect objects present in a field-of-view proximate to a host-vehicle on which the radar-sensor is mounted. The radar-sensor is operable to determine a measured-range-rate (dRm), a measured-azimuth-angle (Am), and a measured-elevation-angle (Em) to each of at least three objects present in the field-of-view. The speed-sensor is used to determine a measured-speed (Sm) of the host-vehicle. The controller is in communication with the radar-sensor and the speed-sensor. The controller is configured to simultaneously determine a speed-scaling-error (Bs) of the measured-speed, an azimuth-misalignment (Ba) of the radar-sensor, and an elevation-misalignment (Be) of the radar-sensor based on the measured-range-rate, the measured-azimuth-angle, and the measured-elevation-angle to each of the at least three objects, while the host-vehicle is moving.

3 Claims, 6 Drawing Sheets (51) Int. Cl.
  *G01S 13/60*  (2006.01)
  *G01S 7/41*  (2006.01)
  *G01S 13/93*  (2006.01)
  *G01S 13/00*  (2006.01)

(52) U.S. Cl.
  CPC ....... *G01S 13/931* (2013.01); *G01S 2007/403* (2013.01); *G01S 2007/4034* (2013.01); *G01S 2007/4091* (2013.01); *G01S 2013/935* (2013.01); *G01S 2013/9342* (2013.01); *G01S 2013/9346* (2013.01); *G01S 2013/9353* (2013.01); *G01S 2013/9375* (2013.01)

(56) References Cited

U.S. PATENT DOCUMENTS

| | | |
|---|---|---|
| 6,300,896 B1 | 10/2001 | Kull et al. |
| 6,356,229 B1 | 3/2002 | Schneider |
| 6,556,166 B1 * | 4/2003 | Searcy ................. G01S 7/4026 342/165 |
| 6,714,156 B1 * | 3/2004 | Ibrahim ................ G01S 7/4026 342/165 |
| 2003/0034913 A1 | 2/2003 | Asanuma et al. |
| 2003/0090411 A1 * | 5/2003 | Haney ................... G01S 7/4026 342/165 |
| 2007/0115169 A1 | 5/2007 | Kai et al. |
| 2015/0005993 A1 | 1/2015 | Breuing |
| 2015/0276923 A1 * | 10/2015 | Song .................... G01S 13/931 702/97 |

* cited by examiner

FIG. 8

AUTOMATED VEHICLE RADAR SYSTEM WITH AUTO-ALIGNMENT FOR AZIMUTH, ELEVATION, AND VEHICLE SPEED-SCALING-ERROR

TECHNICAL FIELD OF INVENTION

This disclosure generally relates to a radar system, and more particularly relates to a system that auto-aligns a radar-sensor while the host-vehicle of the system is moving.

BACKGROUND OF INVENTION

It is known that automotive radar-sensors need to be aligned with the chassis of a host-vehicle so the location of detected objects is accurately known. Alignment procedures performed when the host-vehicle is assembled are not able to compensate for pitch or elevation errors caused by heavy cargo and yaw or azimuth errors caused by miss-alignment of the wheels or chassis of the host-vehicle which may cause 'crabbing' or 'dog-tracking' by the host-vehicle while traveling.

SUMMARY OF THE INVENTION

In accordance with one embodiment, a radar system with auto-alignment suitable for use in an automated vehicle is provided. The system includes a radar-sensor, a speed-sensor, and a controller. The radar-sensor is used to detect objects present in a field-of-view proximate to a host-vehicle on which the radar-sensor is mounted. The radar-sensor is operable to determine a measured-range-rate (dRm), a measured-azimuth-angle (Am), and a measured-elevation-angle (Em) to each of at least three objects present in the field-of-view. The speed-sensor is used to determine a measured-speed (Sm) of the host-vehicle. The controller is in communication with the radar-sensor and the speed-sensor. The controller is configured to simultaneously determine a speed-scaling-error (Bs) of the measured-speed, an azimuth-misalignment (Ba) of the radar-sensor, and an elevation-misalignment (Be) of the radar-sensor based on the measured-range-rate, the measured-azimuth-angle, and the measured-elevation-angle to each of the at least three objects, while the host-vehicle is moving.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
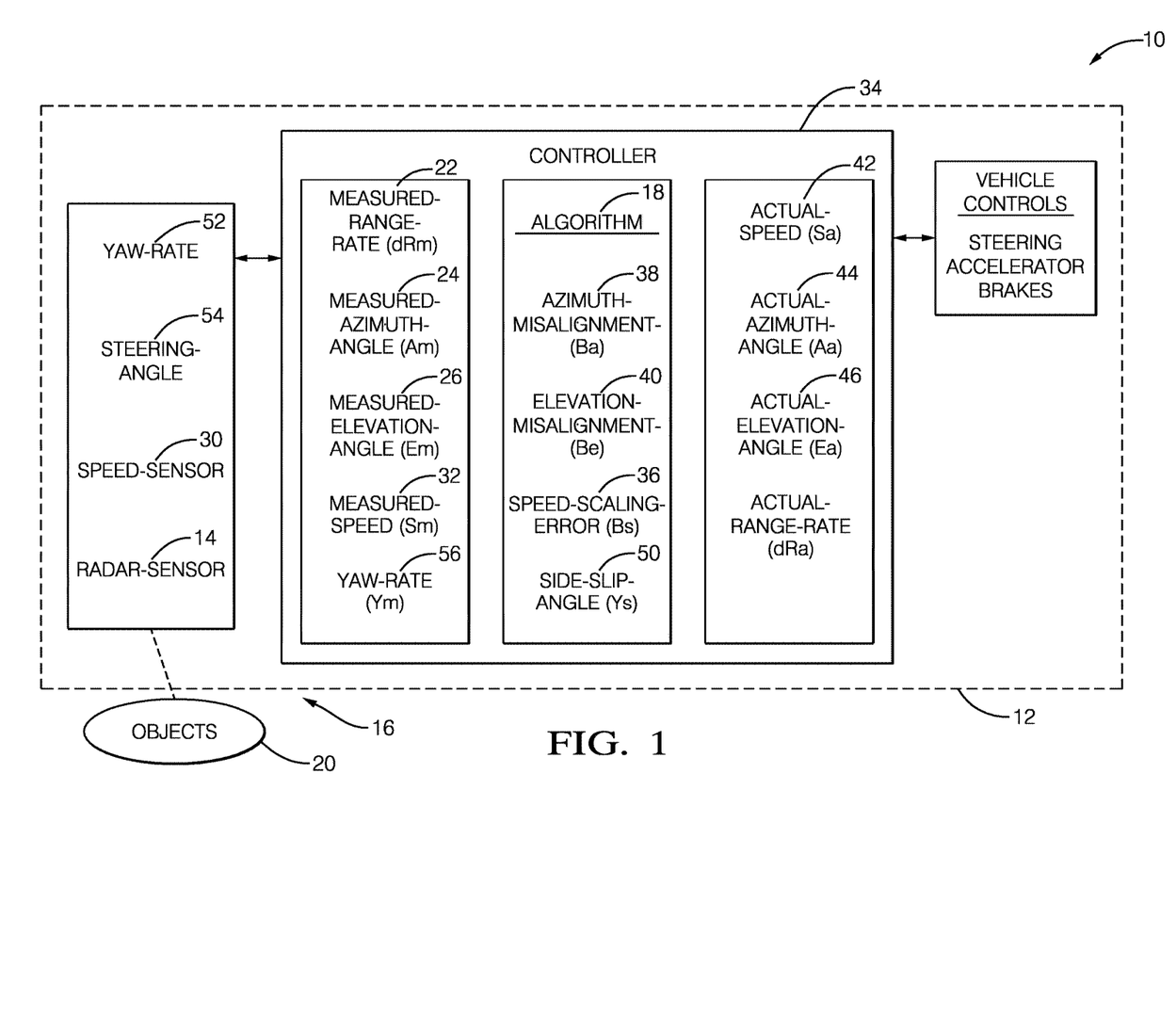
FIG. 1 is diagram of a radar system with auto-alignment in accordance with one embodiment.

FIG. 1 illustrates a non-limiting example of a radar system 10, hereafter referred to as the system 10. The system 10 is generally suitable for use in an automated vehicle, a host-vehicle 12 for example, and is equipped with an auto-alignment feature for aligning a radar-sensor 14 with a reference frame established by the body of the host-vehicle 12. The performance and utility of an automotive radar system is improved if the radar target tracker algorithm, hereafter referred to as the tracker, has knowledge of (i.e. is programmed or calibrated with) the actual angular mounting orientation of the radar-sensor relative to the field-of-view 16 observed by the radar-sensor and/or the vehicle or structure on which the radar-sensor is mounted. Advantageously, this is accomplished using an auto-alignment algorithm, hereafter often referred to as the algorithm 18, which determines an actual or true angular orientation the radar-sensor(s).

The actual angular orientation is usually a small deviation from an expected or typical orientation that the tracker has been preprogrammed with. The auto-alignment algorithm described herein is for use on a host-vehicle as it observes or tracks stationary objects or targets as the host-vehicle travels along a road. It has been observed that the auto-alignment algorithm described herein is an improvement over prior examples of auto-alignment algorithms as the prior examples take several minutes or more to complete the auto-alignment process, require a stationary host-vehicle with a pre-determined arrangement of reference targets, and/or are prone to error as the correction factors needed to compensate for the small deviation from the expected or typical orientation are determined sequentially as the vehicle travels which can introduce unknown errors.

Some known radar systems used on vehicles only perform an azimuth angle auto-alignment as those systems are only capable of detecting range and azimuth angle to a target or object. The radar system described herein is further able to measure elevation angle in addition to range and azimuth angle, so an elevation alignment is also desired.

An auto-alignment method has been proposed that compares a detected range-rate of a stationary target to a measured speed of the host-vehicle, and compensates for azimuth angle to the stationary target. However, the speed generally has a 'speed ratio' or speed-scaling-error, meaning that the measured speed is proportional to the actual speed with an error of a certain percentage, 1% for example. This proportionality error can be due to, for example, worn tire rubber, and/or wheels with non-standard radii. Depending on how the auto-alignment algorithm is configured, the effect of the speed-scaling-error on estimated misalignment angles can be significant.

The auto-alignment algorithm described herein jointly or simultaneously estimates the speed-scaling-error, azimuth alignment error (azimuth-misalignment), and elevation alignment error (elevation-misalignment). Simultaneous computation is advantageous as mutual correlations of the errors are considered. That is, the algorithm described herein is superior to the algorithms that compute these errors separately, e.g., computing one error after another. Separate or sequential computation suffers from the mutual correlation of the errors because, for example, the azimuth-misalignment depends on the other two errors. In order to minimize the inaccuracies, multiple iterations may necessary which undesirably takes time.

It acknowledged that it is known to perform a static calibration that measures the radar-sensor mounting angles using a stationary host-vehicle and a known set of reference targets, e.g.—corner reflectors located at carefully measured positions in an open space around the vehicle. However, this technique is deemed inadequate because the host vehicle's dynamic longitudinal axis is not easily determined from visual inspection of a stationary vehicle. For example, the vehicle might 'crab' as it moves in a straight line down the road, meaning that what appears to be the longitudinal axis of the host-vehicle determined based on visual symmetry of the vehicle body might actually be pointing in a substantially different direction when the vehicle is moving. As such, azimuth angle misalignment will occur regardless of how carefully the test measurements were taken. Also, changes in cargo load can affect the elevation angle of the radar-sensor, which may be different from when the static calibration was performed.

Continuing to refer to FIG. 1, the radar-sensor 14 is used to detect instance of objects 20 present in a field-of-view 16 proximate to the host-vehicle 12 on which the radar-sensor 14 is mounted. The radar-sensor 14 is operable to determine or measure various values or variable from the returned radar-signal reflected by the objects 20 including, but not limited to, a measured-range-rate 22 (dRm), a measured-azimuth-angle 24 (Am), and a measured-elevation-angle 26 (Em) to the objects 20. As will be described in more detail below, the algorithm 18 needs at least three (3) instances of the objects 20 to perform the auto-alignment, so each of at least three (3) instances of the objects 20 must be present in the field-of-view 16.

Figure 2:
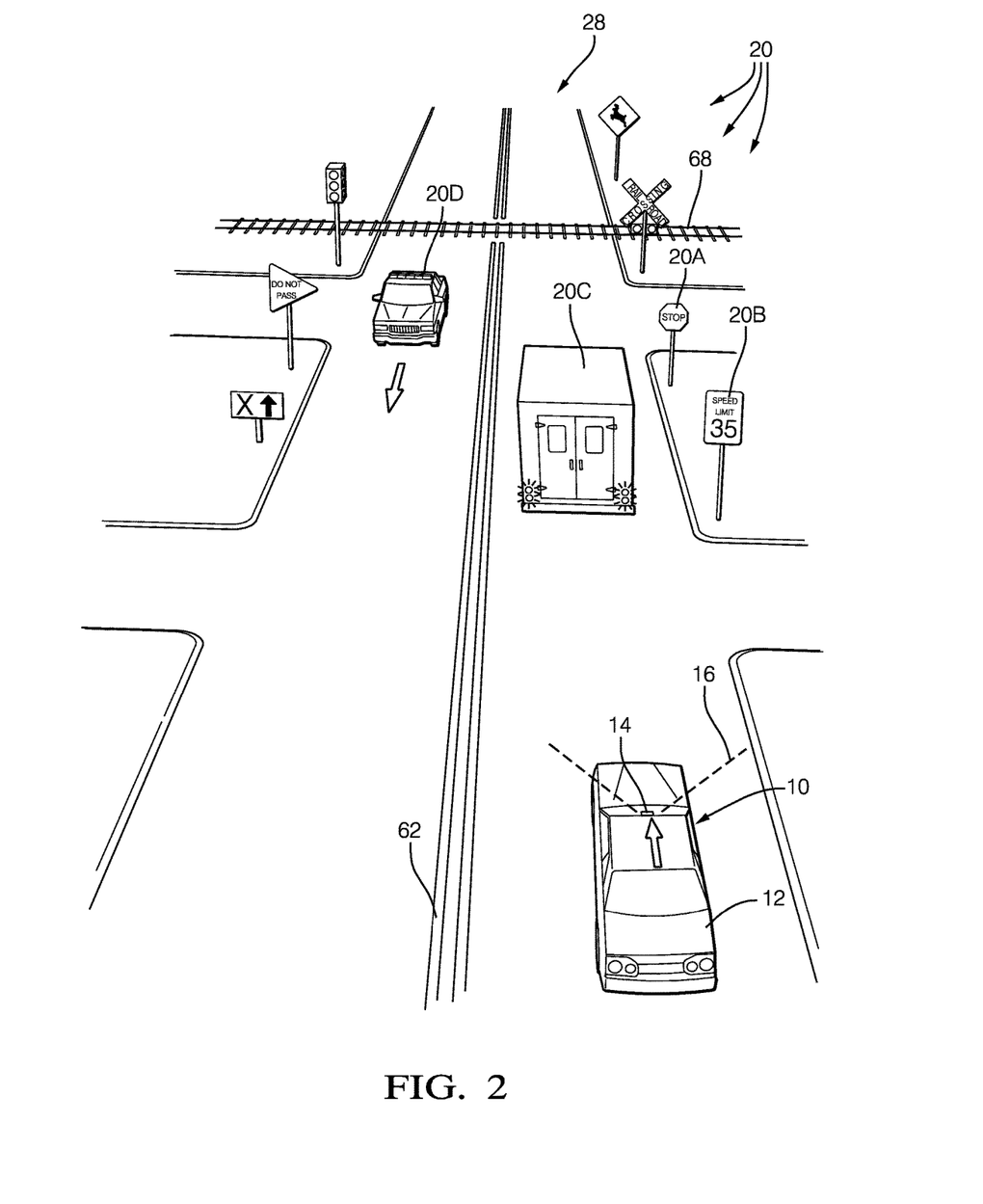
FIG. 2 is a traffic scenario that may be encountered by the system of FIG. 1 in accordance with one embodiment.

FIG. 2 illustrates a non-limiting example of a traffic-scenario 28 that may be experienced by the host-vehicle 12 while the system 10 attempts to auto-align the radar sensor 14. As will also be described below, the auto-alignment process carried out by the algorithm 18 is greatly simplified when each of the at least three objects is not moving, i.e. can be characterized as stationary. By way of example and not limitation, the objects 20 used as points of reference by the system 10 for auto-alignment may include a stop-sign 20A, a speed-limit-sign 20B, and/or a stopped-vehicle 20C. By way of further example, an approaching-vehicle 20D would not be a preferable instance of the objects 20 to use for auto-alignment unless the speed of the approaching-vehicle 20D was known by the system 10 because the approaching speed was communicated to the system 10 by way of vehicle-to-vehicle (V2V) communications, the configuration and operation of which is recognized by those in the art.

The system 10 also includes a speed-sensor 30 used to indicate or determine a measured-speed 32 (Sm) of the host-vehicle 12. By way of example and not limitation, the speed-sensor 30 may be the same sensor used to determine what speed to indicate on a speedometer display (not shown) of the host-vehicle 12, which would be based on the rotational speed of the wheels of the host-vehicle as will be recognized by those in the art.

The system 10 also includes a controller 34 in communication with the radar-sensor 14 and the speed-sensor 30. The controller 34 may include a processor (not specifically shown) such as a microprocessor or other control circuitry such as analog and/or digital control circuitry including an application specific integrated circuit (ASIC) for processing data as should be evident to those in the art. The controller 34 may include memory (not specifically shown), including non-volatile memory, such as electrically erasable programmable read-only memory (EEPROM) for storing one or more routines, thresholds, and captured data. The one or more routines may be executed by the processor to perform steps for determining error correction factors or offsets to auto-align the radar-sensor 14 based on signals received by the controller 34 as described herein.

As part of the auto-alignment process, the controller 34 is programmed with the algorithm 18, so the controller 34 is configured to jointly or simultaneously determine a speed-scaling-error 36 (Bs) of the measured-speed 32, an azimuth-misalignment 38 (Ba) of the radar-sensor 14, and an elevation-misalignment 40 (Be) of the radar-sensor 14 based on the measured-range-rate 22, the measured-azimuth-angle 24, and the measured-elevation-angle 26 to each of the at least three instances of the objects 20. Advantageously, the algorithm 18 performs the auto-alignment of the radar-sensor 14 while the host-vehicle 12 is moving. It is noted that the algorithm 18 described herein is advantageous over alignment schemes that would only align the radar-sensor 14 when the host vehicle is stopped and/or when presented an arrangement of targets pre-positioned an known locations because the algorithm 18 is able to correct for dynamic conditions of the host-vehicle 12 such as wheel misalignment that affect het azimuth angle, and/or varying cargo loads that affect the elevation angle of the radar-sensor 14

The controller 34 may be further programmed or further configured to determine an actual-speed 42 (Sa) based on the measured-speed 32 and the speed-scaling-error 36, an actual-azimuth-angle 44 (Aa) to the objects 20 based on the azimuth-misalignment 38 and the measured-azimuth-angle 24, and an actual-elevation-angle 46 (Ea) to the objects 20 based on the elevation-misalignment 40 and the measured-elevation-angle 26. The details of these calculations will also be presented below.

The algorithm 18 may collect a sufficient number of detections of the objects 20 in a single instant, or may collect detections over a multitude of time instants. At some time instants, it may be that no suitable detections are found, and these time instants can be ignored. By collecting data over many time instants, the corrupting effects of errors not included in the model of algorithm are 'averaged out'. The data from these multiple time instants can be batch processed, or a recursive filter can be used. In either case, the equation shown below forms the heart of the implementation, and a person skilled in the art could successfully implement either the batch or recursive forms of the method.

The radar-sensor 14 described herein is assumed to be, without loss of generality, mounted on the host-vehicle 12. A three-dimensional (3D) orthogonal Cartesian coordinate system is used, with origin of coordinates located at the radar-sensor 14. The positive x-axis points horizontally forward parallel to the vehicle's dynamic longitudinal axis. The positive y-axis points in a horizontal lateral direction toward the vehicle's right side. The positive z-axis points downward and is orthogonal to the x- and y-axes.

The actual-azimuth-angle 44 of the boresight vector of the radar-sensor 14 is defined as the angle through which a vertical plane containing the positive x-axis needs to be rotated about the z-axis (using a sign convention defined by the right-hand rule) in order to contain the detection or boresight vector in that rotated vertical plane. The actual-elevation-angle 46 (Ea) of the boresight vector of the radar-sensor 14 is defined as the angle through which a vector contained in the intersection of the x-y plane and the azimuthally-rotated vertical plane needs to be rotated upward to be coincident with the detection or boresight vector. Detections which are above the x-y plane have a positive elevation angle. This convention agrees with a right-hand rule about the y-axis.

Singularities in this representation of azimuth and elevation angles (e.g., at points on the z-axis) are not of concern in the automotive application with radars having a somewhat limited vertical field-of-view.

Definitions of the 'actual' (i.e. the measurement-error-free value) variable names or symbols, and the 'measured' (i.e. indicated by measurements made by the radar-sensor 14) variable names or symbols used herein are defined as follows:

dRa(i), dRm(i): actual-range-rate 48 and measured-range-rate 22 of the i-th object detection;

Aa(i), Am(i): actual-azimuth-angle 44 and measured-azimuth-angle 24 of the i-th detection;

Ea(i), Em(i): actual-elevation-angle 46 and measured-elevation-angle 26 of the i-th detection;

Ua(i), Va(i), Wa(i): actual-longitudinal, actual-lateral, and actual-vertical components of the actual velocity vector or the radar-sensor 14 relative to Earth at the time the i-th detection is observed;

Um(i), Vm(i), Wm(i): measured-longitudinal, measured-lateral, and measured-vertical components of measured velocity vector of the radar-sensor 14 relative to Earth at the time the i-th detection is observed;

Ut(i), Vt(i), Wt(i): longitudinal, lateral, vertical of indicated velocity vectors relative to Earth of the i-the object (i.e. target) detection;

Ys(i): side-slip-angle 50 of the host-vehicle 12 at the time the i-th object detection is observed, where the slide-slip-angle is the angle between the horizontal host-vehicle velocity vector (i.e. the vector [Ua Va 0]) and the x-axis;

Ba: bias error in measured azimuth angle, i.e. the azimuth-misalignment 38;

Be: bias error in measured elevation angle, i.e. the elevation-misalignment 40; and Bs: speed-scaling-error 36 in host vehicle speed.

The error models considered here can be summarized as:

$Am(i)=Aa(i)+Ba$: model of azimuth-misalignment    Eq. 1;

$Em(i)=Ea(i)+Be$: model of elevation-misalignment    Eq. 2;

and $Sm(i)=(1+Bs)*Sa(i)$: model of speed-scaling-error at the time the *i-th* detection is observed    Eq. 3.

In the models of the azimuth misalignment and elevation misalignment shown above, the misalignment is represented as a constant bias error in the measured angle. In the speed scaling error model, the measured speed is modeled as the actual speed corrupted by the speed-scaling-error 36. The (1+Bs) form of the scaling-factor is useful because a value of Bs=0 corresponds to zero measurement error.

The actual-range-rate 48 depends on the relative-to-Earth velocity vectors of the radar-sensor 14 and the instances of the objects 20 that are detected, along with the actual-azimuth-angle 44 and the actual-elevation-angle 46 of the object detected relative to the radar-sensor 14. For the i-th detection, Eq. 4 defines the actual-range-rate 48 as—

$dRa(i)=(Ut(i)-Ua(i))*\cos[Aa(i)]*\cos[Ea(i)]+(Vt(i)-Va(i))*\sin[Aa(i)]*\cos[Ea(i)]-(Wt(i)-Wa(i))*\sin[Ea(i)]$    Eq. 4.

Since the objects 20 (i.e. targets of interest) are intended or believed to be stationary, the values of Ut(i), Vt(i), and Wt(i) for all values of (i) are assumed to be identically equal to zero. Applying the error models defined above produces the equation below which can be implemented in either batch or recursive form over multiple time instants with multiple radar detections as indicated in the preceding text. As noted above, relative motion between the radar-sensor 14 and stationary targets (the objects 20) is necessary, hence the actual-longitudinal-speed of the radar-sensor, Ua(i), is assumed to be nonzero. Combining Eqs. 1-4 produces Eq. 5, from which the errors Bs, Ba, and Be can be determined using:

$dRm(i)+Um(i)*\cos[Am(i)]*\cos[Em(i)]+Vm(i)*\sin[Am(i)]*\cos[Em(i)]=[H(i,1)H(i,2)H(i,3)]*\text{trans}[Bs\ Ba\ Be]$    Eq. 5, where $H(i,1)=Um(i)*\cos[Am(i)]*\cos[Em(i)]$    Eq. 6, $H(i,2)=-Um(i)*\sin[Am(i)]*\cos[Em(i)]+Vm(i)*\cos[Am(i)]*\cos[Em(i)]$    Eq.7, $H(i,3)=-Um(i)*\cos[Am(i)]*\sin[Em(i)]-Vm(i)*\sin[Am(i)]*\sin[Em(i)]$    Eq. 8, and trans[ ] is the matrix transpose operation    Eq. 9.

In the derivation of Eq. 5 the measured value of the radar-sensor's longitudinal and lateral velocities, Um(i) and Vm(i), are assumed to be subject to the same speed-scaling-error as Sm(i), that is Um(i)=(1+Bs)*Ua(i) and Vm(i)=(1+Bs)*Va(i), and the actual and the measured vertical velocity of the radar-sensor, Wa(i) and Wm(i), are assumed to be zero.

Eq. 10 is a simplified version of Eq. 5 that is suitable for conditions of operation in which the host vehicle is traveling in a straight line, i.e. the actual lateral velocity of the sensor is approximately zero. Eq. 10 is derived from Eq. 5 by setting Vm(i) equal to zero and dividing though by Um(i), so $dRm(i)/Um(i)+\cos[Am(i)]*\cos[Em(i)]=[F(i,1)F(i,2)F(i,3)]*\text{trans}[Bs\ Ba\ Be]$    Eq. 10, where $F(i,1)=\cos[Am(i)]*\cos[Em(i)]$    Eq. 11, $F(i,2)=-\sin[Am(i)]*\cos[Em(i)]$    Eq. 12, and $F(i,3)=-\cos[Am(i)]*\sin[Em(i)]$    Eq. 13.

Figure 3:
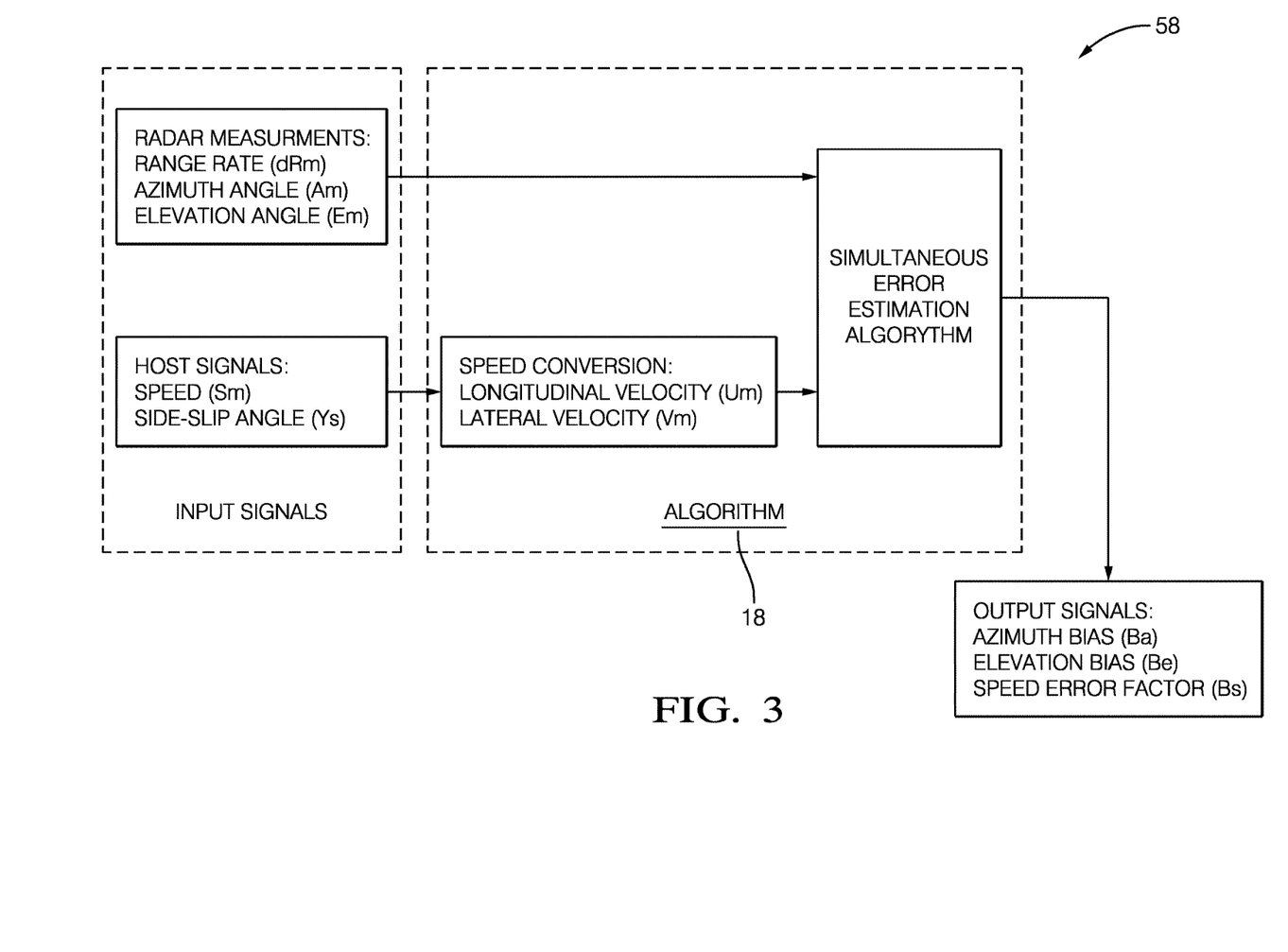
FIG. 3 is a diagram of an algorithm executed by the system of FIG. 1 in accordance with one embodiment.

To solve Eq. 5, the following signals or values are needed: A) Radar measurements dRm(i), Am(i) and Em(i), which are provided by radar-sensor, and B) Host velocity components Um(i) and Vm(i), recall that Wm(i)=0 is assumed. The host module may measure the host speed Sm directly, but may not be capable to measure the side-slip-angle 50 (Ys) directly. The side-slip-angle 50 can be computed based on combinations of other variables such as the measured-speed 32, a yaw-rate-sensor 52, steering-angle-sensor 54, etc. Accordingly, the system 10 may include the yaw-rate-sensor 52 which is used to determine a yaw-rate 56 of the host-vehicle 12. Accordingly, the controller 34 is further configured to determine the side-slip-angle 50 (Ys) of the host-vehicle 12 based on the yaw-rate 56, and further determine the speed-scaling-error 36, the azimuth-misalignment 38, and the elevation-misalignment 40 based on the side-slipangle 50. Many methods exist for this purpose, as will be recognized by those in the art. Regardless of which method is used there, the algorithm receives from the host module output values for Sm and Ys. The measured host velocity components needed in Eq. 5 are computed using Um=Sm*cos [Ys], and Vm=Sm*sin [Ys]. If the host is or is almost traveling straight on a flat road, then Ys is negligible. So the velocity components are determined as Um(i)=Sm(i), and Vm(i)=0. A non-limiting example of a diagram 58 of the algorithm is shown in FIG. 3.

A batch least squares problem can be formed by stacking a number of Eq. 5 or Eq. 10 vertically to form an array with one equation for each i-th detection. Accordingly, for the i-th detection, Um(i), Vm(i), Wm(i), dRm(i), Am(i), Em(i) are collected for a total of N detections, where N is greater than or equal to three (N≥3). For Eq. 5, a least squares problem leading to a batch solution could take the form:

$$D1 = H*P, \qquad \text{Eq. 13}$$
where $$D1 = \begin{bmatrix} dRm(1) + Um(1)*\cos[Am(1)]*\cos[Em(1)] + \\ Vm(1)*\sin[Am(1)]*\cos[Em(1)] \\ \vdots \\ dRm(N) + Um(N)*\cos[Am(N)]*\cos[Em(N)] + \\ Vm(N)*\sin[Am(N)]*\cos[Em(N)] \end{bmatrix}, \qquad \text{Eq. 14}$$

$$H = \begin{bmatrix} H(1,1) & H(1,2) & H(1,3) \\ \vdots & \vdots & \vdots \\ H(N,1) & H(N,2) & H(N,3) \end{bmatrix}, \qquad \text{Eq. 15}$$

and $$P = trans[\ Bs\ Ba\ Be\ ]. \qquad \text{Eq. 16}$$

Then the estimate of P (EP) is made using Eq. 17, where $$EP=\text{inv}[trans[H]*H]*trans[H]*D1 \qquad \text{Eq. 17,}$$

where inv[ ] is the matrix inversion operation.

For the Eq. 10, a least squares problem leading to a batch solution could take the form of Eq. 18, where $$\begin{bmatrix} dRm(1)/Um(1) + \cos[Am(1)]*\cos[Em(1)] \\ \vdots \\ dRm(N)/Um(N) + \cos[Am(N)]*\cos[Em(N)] \end{bmatrix} = \qquad \text{Eq. 18}$$
$$\begin{bmatrix} F(1,1) & F(1,2) & F(1,3) \\ \vdots & \vdots & \vdots \\ F(N,1) & F(N,2) & F(N,3) \end{bmatrix} \begin{bmatrix} Bs \\ Ba \\ Be \end{bmatrix}$$

Similar to Eq. 13, a way to solve Eq. 18 as a least squares problem is to rewrite it in the form $$D2 = F*P, \qquad \text{Eq. 19}$$
where $$D2 = \begin{bmatrix} dRm(1)/Um(1) + \cos[Am(1)]*\cos[Em(1)] \\ \vdots \\ dRm(N)/Um(N) + \cos[Am(N)]*\cos[Em(N)] \end{bmatrix}, \qquad \text{Eq. 20}$$

-continued $$F = \begin{bmatrix} F(1,1) & F(1,2) & F(1,3) \\ \vdots & \vdots & \vdots \\ F(N,1) & F(N,2) & F(N,3) \end{bmatrix}, \qquad \text{Eq. 21}$$

and $$P = trans[\ Bs\ Ba\ Be\ ]. \qquad \text{Eq. 22}$$

Then the estimate of P (EP) is provided in Eq. 23, where $$EP=\text{inv}[trans[F]*F]*trans[F]*D2 \qquad \text{Eq. 23.}$$

A method of solving Eq. 5 may include the steps of:
a) collect radar measurements dRm(i), Am(i) and Em(i) for i=1, . . . N, N≥3;
b) collect host module outputs Sm(i) and Ys(i) for i=1, . . . N;
c) determine the host velocity components Um(i) and Vm(i) using Um=Sm*cos [Ys], and Vm=Sm*sin [Ys], where if the host-vehicle 12 is going straight the substitution may be simplified by using Um(i)=Sm(i) and Vm(i)=0; and
d) determine the estimate of P (EP) using Eqs. 13-17.

In another embodiment of the algorithm 18, a batch solution shown above is solved at each time instant using detections from only that time instant. This requires a test at each time instant which ensures that the least squares problem is sufficiently well-conditioned for a solution to be attempted. A simple form of this test requires a minimum number of detections having sufficient diversity in the detected or measured azimuth and elevation angles. The single-time-instant estimates for Bs, Ba, and Be are then used to drive low-pass filters producing slowly time-varying estimates of these parameters. This implementation has the benefit of relative simplicity, but has the drawback that it discards valid detection data at time instants where there are inadequate detections for solving the single-time-instant problem.

The algorithm 18 can also be implemented as a recursive least squares or Kalman filter. Implementations having windowed intervals of interest or fading memory over longer intervals are possible. A practitioner skilled in the art could easily envision how to formulate such a filter based on the Main Equation (Eq. 5) or the Simplified Equation (Eq. 10) shown above.

The algorithm 18 uses raw or measured radar detections of the measured-range-rate 22, the measured-azimuth-angle 24, and the measured-elevation-angle to targets (i.e. the objects) which are perceived to be stationary. The determination that a target or object is stationary relies on the speed signal from the host-vehicle, which is assumed to be corrupted by the speed-scaling-error 36. It also relies on the measured angles, which are assumed to have bias errors due to the misalignment. Fortunately, the determination of stationary/moving is relatively insensitive to the assumed small alignment errors. However, it has been observed that the same is not true of the speed-scaling-error as stationary targets have been determined by the tracker to be moving targets when the speed of the host-vehicle is relatively high, greater than 100 kph for example. Therefore, it is recognized that it is preferable that the auto-alignment is performed at a not too great amount of speed, less than 60 kph for example. At lower speeds the magnitude of the vehicle speed-scaling-error is small enough for the stationary targets to be correctly classified as stationary, or that the stationary/moving threshold is increased with increasing vehicle speed in a way that accounts for the maximum anticipated level of speed-scaling-error. The auto-alignment algorithm is most accurate when run under conditions where the lateral and vertical components of relative-to-Earth velocity of the radar-sensor are nearly zero. Thus, ideal conditions are a straight trajectory on smooth asphalt.

Estimation problems such as the one described in this document rely on an observability condition for success. The parameters are observable if and only if there is sufficient information in the observed quantities for the parameters to be uniquely identified. In the batch formulation of the present algorithm, observability is related to the rank of the (noise-error-free version of the) Nx3 matrix (i.e., it needs to be 3). It has been found that the observability condition is satisfied if there are at least three detections having sufficient azimuth and elevation angle diversity. The auto-alignment algorithm described herein is presented under an assumption of a sufficiently rich and diverse set of detections that the parameters are observable.

The implementations of the algorithm described herein require estimates of the three Cartesian components of the relative-to-Earth velocity of the radar-sensor, Um, Vm, Wm. Though a measured vehicle speed signal is assumed to be available (possibly corrupted by the speed-scaling-error), the measurement/estimation of these three quantities requires some sort of model of the vehicle dynamics, and other sensors such as yaw-rate sensor, pitch-rate sensor, steering wheel sensor, etc. Well known algorithms are available for this subject.

The algorithm 18 described herein is most useful if it includes a confidence indication, in addition to the miss-alignment estimates. This confidence indicator signals to the consumer of the miss-alignment estimates whether or not they are ready to be used and trusted. The algorithm generally will start out by providing somewhat erroneous estimates of the desired quantities, but the error in the estimates should rapidly decrease to a steady-state level. Once this steady-state level is achieved, the algorithm should signal high confidence in the estimates. If something goes wrong and the estimates don't appear to be converging to useful values, then a low confidence should be signaled. Low confidence should also be signaled during the initial transient period prior to successful convergence.

Two schemes for identifying a condition of convergence or high confidence are now described. In one scheme, both short-term and long-term averages are computed for the estimated bias values. If these agree, then successful convergence is indicated. In another scheme, the range-rate residual error (i.e. the difference between the predicted range-rate and the measured range-rate of those stationary objects) is monitored. Ideally, a short-term average of these range-rate residual errors will converge to a minimum value, and when this value is achieved then successful convergence is indicated.

The algorithm 18 has been tested using simulated data in which the actual error parameter values are known, and using real sensor data in which the actual error parameters are not known.

Figure 4:
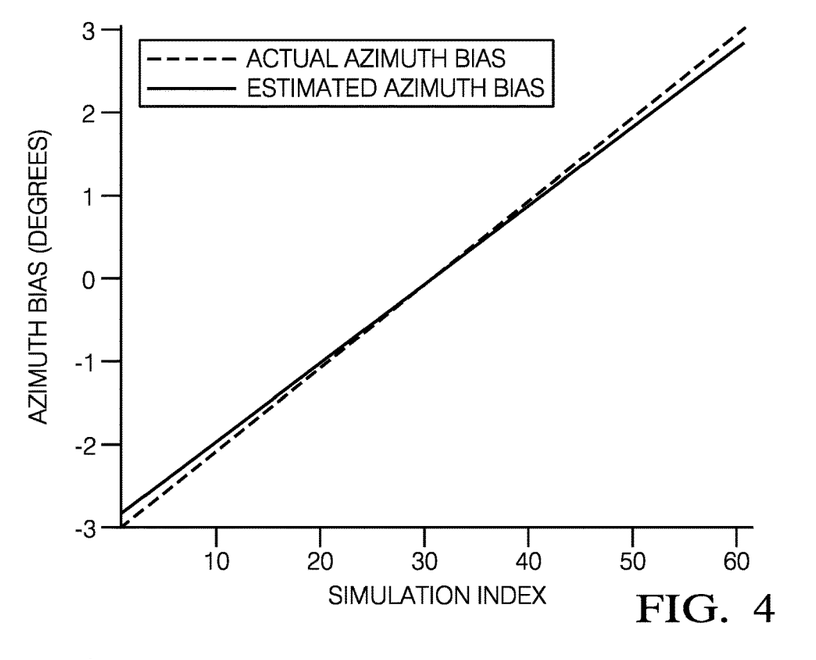
FIG. 4 is a graph of performance results of the system of FIG. 1 in accordance with one embodiment.

FIG. 4 shows the results of 60 simulation runs, each representing a different level of actual simulated azimuth angle bias between −3.0 and +3.0 degrees. In each simulation run, the simulated speed-scaling-error is 5.0%, the simulated elevation angle bias is 2.0 degrees, and the simulated range rate has a bias of −0.1 meters/second. The simulated measurements of both azimuth and elevation angles and range rate are additionally corrupted by zero-mean Gaussian noise having standard deviations of 1.0 degrees (azimuth), 2.0 degrees (elevation), and 0.1 meters/second (range rate). For each simulation run at a particular azimuth angle bias level, sufficient data points are simulated to allow the algorithm estimates to converge. The actual or true azimuth angle bias varies from −3.0 to +3.0 degrees and the estimated azimuth bias is produced by the algorithm 18. In this plot, the horizontal axis labeled "simulation index" represents different simulation runs, each having a particular value of simulated azimuth angle bias as given by the corresponding value of the actual azimuth bias.

Figure 5:
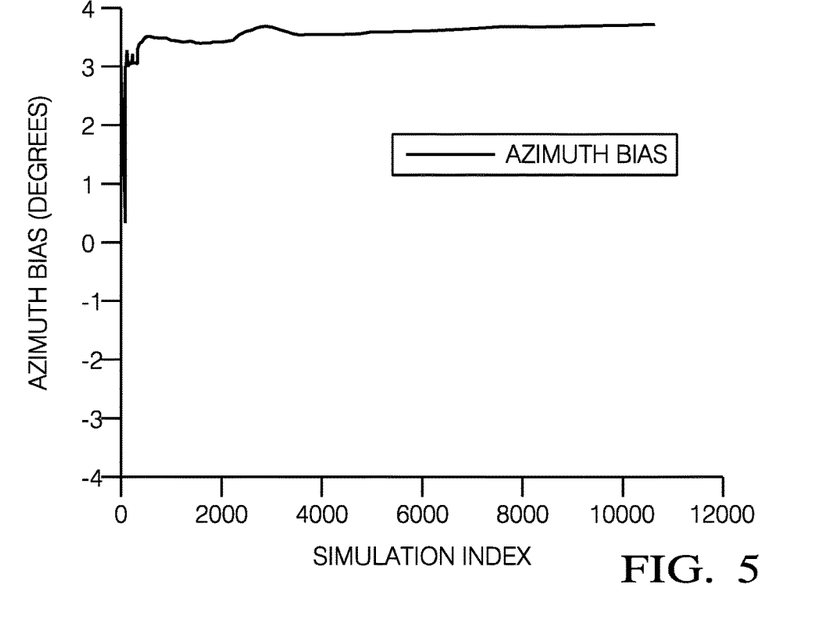
FIG. 5 is a graph of performance results of the system of FIG. 1 in accordance with one embodiment.
Figure 6:
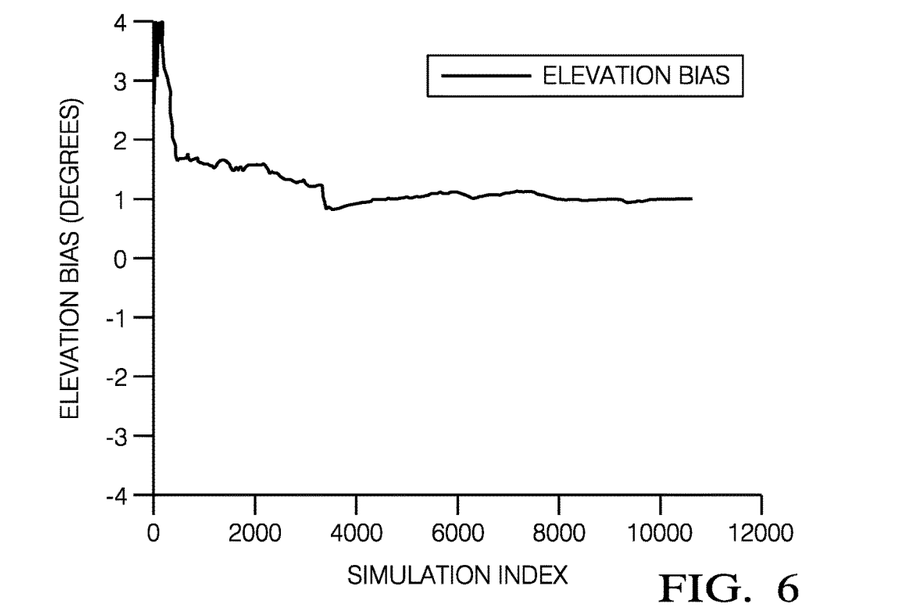
FIG. 6 is a graph of performance results of the system of FIG. 1 in accordance with one embodiment.
Figure 7:
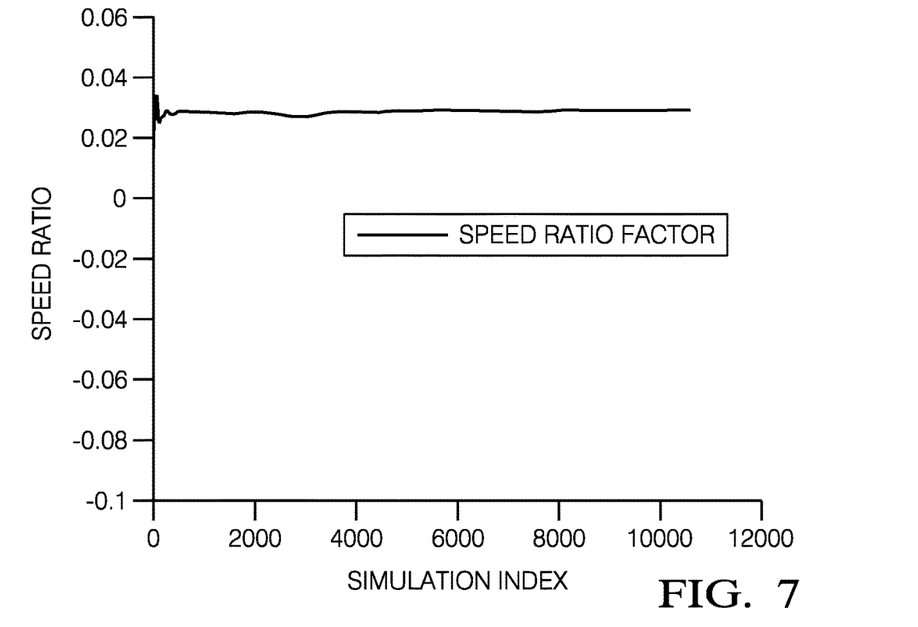
FIG. 7 is a graph of performance results of the system of FIG. 1 in accordance with one embodiment.

FIGS. 5-7 show estimates of azimuth angle bias, elevation angle bias, and speed-scaling-error, respectively, which were obtained for a single data file from an exemplary radar sensor. In these plots, the horizontal axis labeled "simulation index" represents Time (expressed in number of radar scans). Since this is real sensor data, the actual or true values of the error parameters are not known. The plots show reasonable-looking convergence to values in the expected ranges.

Figure 8:
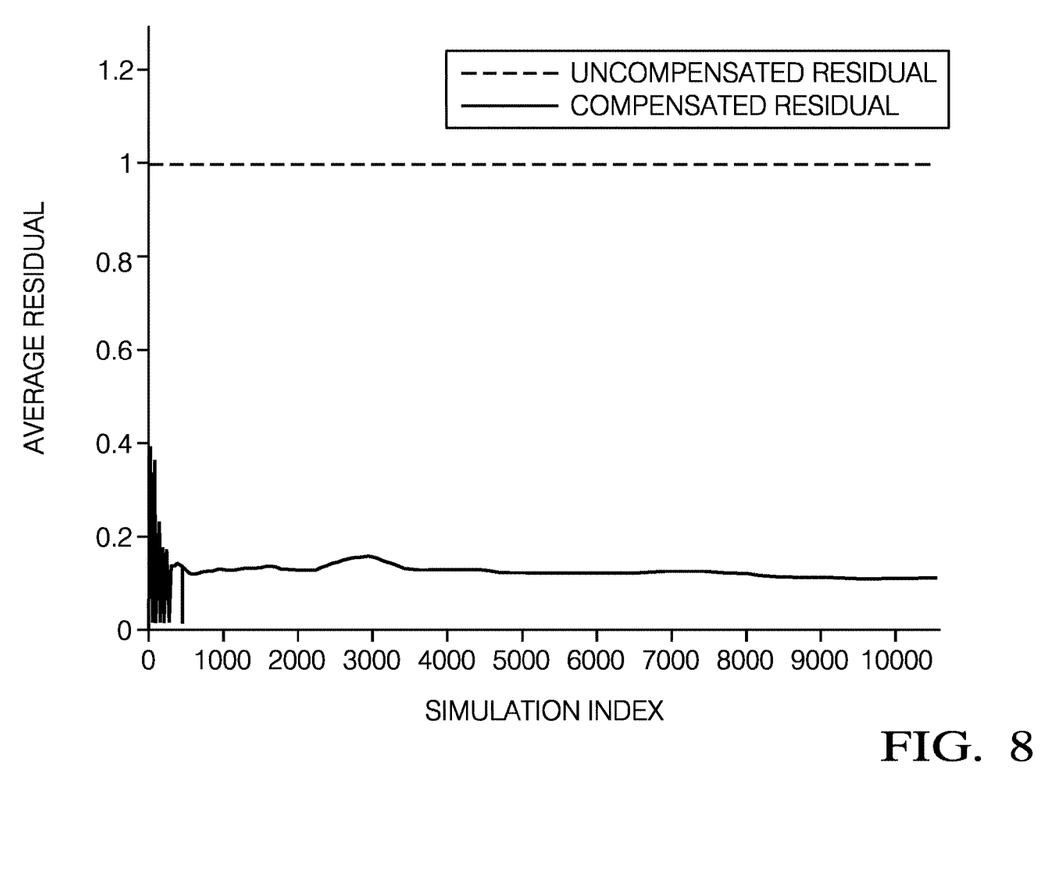
FIG. 8 is a graph of performance results of the system of FIG. 1 in accordance with one embodiment.

FIG. 8 shows that an estimation quality measure is significantly improved by the obtained estimates, compared to initial assumed values of zero for all of the error parameters being estimated. Specifically, the residual error (which is the disagreement between the measured-range-rate and a predicted-range-rate) is smaller after the error parameters are compensated.

Accordingly, a radar system (the system 10), a controller 34 for the system 10, and a method of operating the system 10 is provided that auto-aligns a radar-sensor 14 on a host-vehicle 12 by simultaneously (i.e. not separately or sequentially) solves for errors in a measured-range-rate (dRm), a measured-azimuth-angle (Am), and a measured-elevation-angle (Em), while the host-vehicle 12 is moving. An estimation scheme in which the quantities of interest are jointly estimated is generally superior to alternative methods, due to the simultaneous accounting for all of the error sources. Good estimates of the error parameters estimated by the algorithm 18 are of critical importance to tracking and fusion systems using the radar-sensor, as they allow the important quantities host speed, azimuth angle and elevation angle to be compensated for the errors present there.

While this invention has been described in terms of the preferred embodiments thereof, it is not intended to be so limited, but rather only to the extent set forth in the claims that follow.

We claim:

1. A radar system with auto-alignment, said system comprising:
   a radar-sensor used to detect objects present in a field-of-view proximate to a host-vehicle on which the radar-sensor is mounted, said radar-sensor operable to determine a measured-range-rate (dRm), a measured-azimuth-angle (Am), and a measured-elevation-angle (Em) to each of at least three objects present in the field-of-view;
   a speed-sensor used to determine a measured-speed (Sm) of the host-vehicle; and
   a controller in communication with the radar-sensor and the speed-sensor, said controller configured to simultaneously determine a speed-scaling-error (Bs) of the measured-speed, an azimuth-misalignment (Ba) of the radar-sensor, and an elevation-misalignment (Be) of the radar-sensor based on the measured-range-rate, the measured-azimuth-angle, and the measured-elevation-angle to each of the at least three objects, while the host-vehicle is moving, wherein the system includes a yaw-rate-sensor used to determine a yaw-rate of the host-vehicle, wherein the controller is further configured to determine a side-slip-angle (Ys) of the host-vehicle based on the yaw-rate, and further determine the speed-scaling-error, the azimuth-misalignment, and the elevation-misalignment based on the side-slip-angle.

2. The system in accordance with claim 1, wherein, said controller further configured to determine an actual-speed (Sa) based on the measured-speed and the speed-scaling-error, an actual-azimuth-angle (Aa) to the objects based on the azimuth-misalignment and the measured-azimuth-angle, and an actual-elevation-angle (Ea) to the objects based on the elevation-misalignment and the measured-elevation-angle.

3. The system in accordance with claim 1, wherein each of the at least three objects is characterized as stationary.

* * * * *